Sept. 22, 1931.    G. R. MEYERCORD ET AL    1,824,223
COTTON HARVESTING MACHINE
Filed Feb. 18, 1929    15 Sheets-Sheet 15
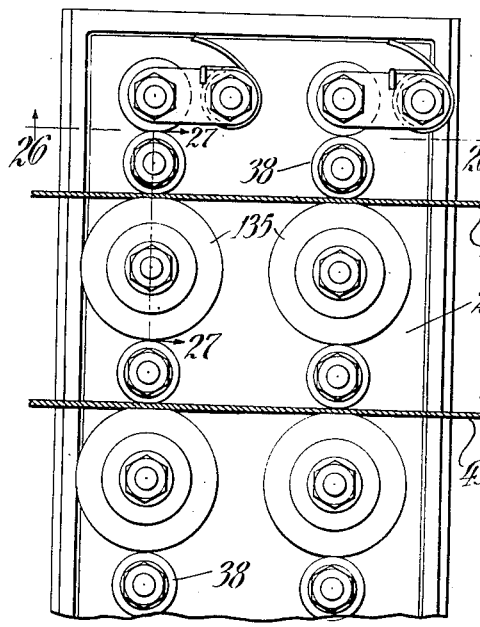
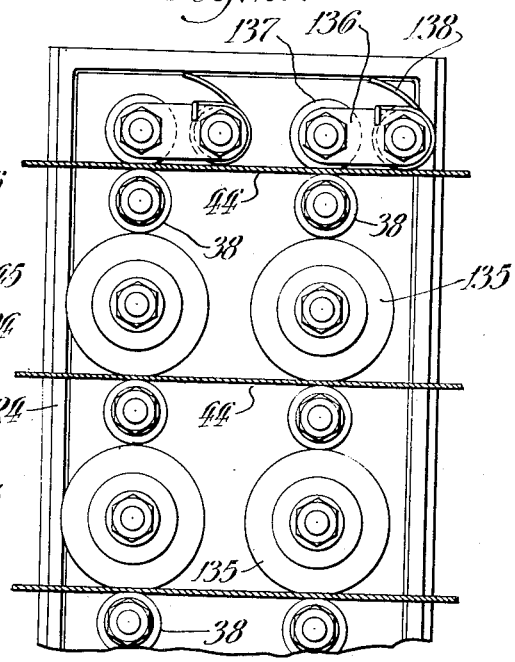
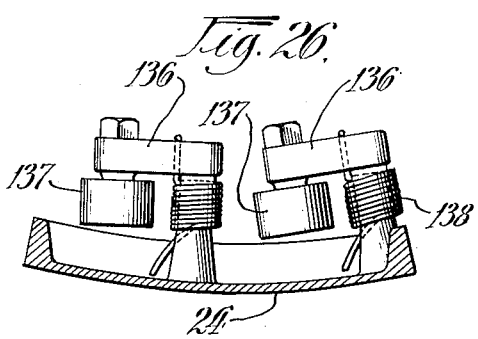
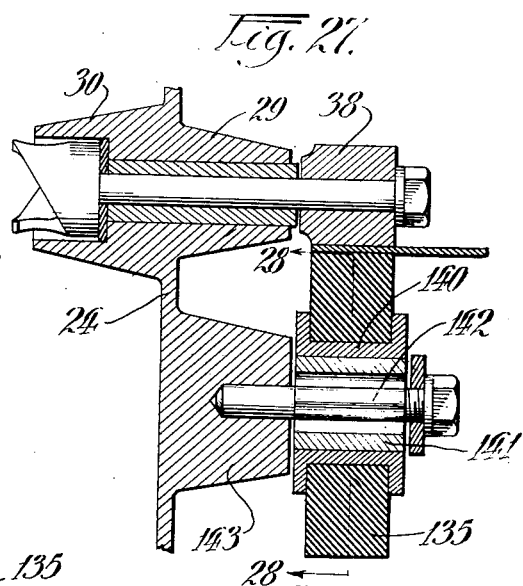

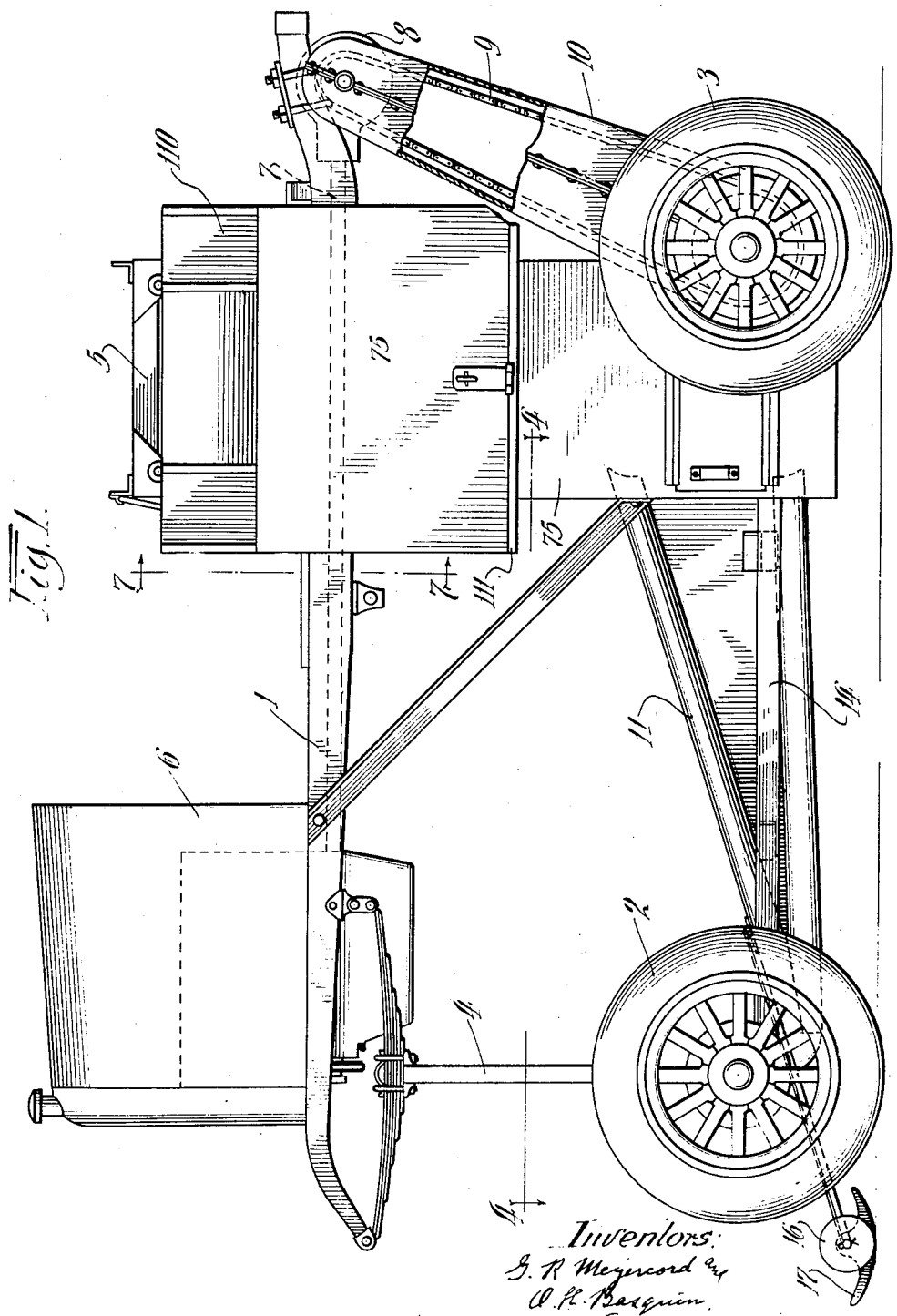

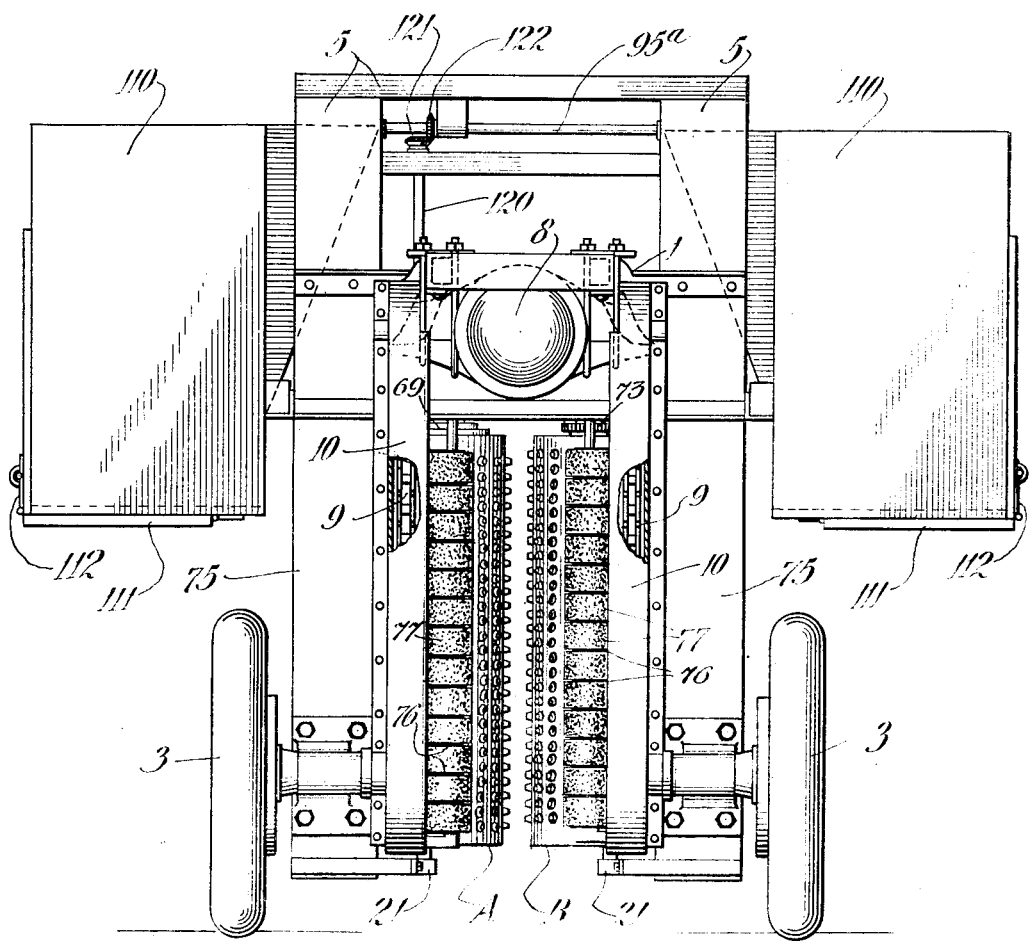

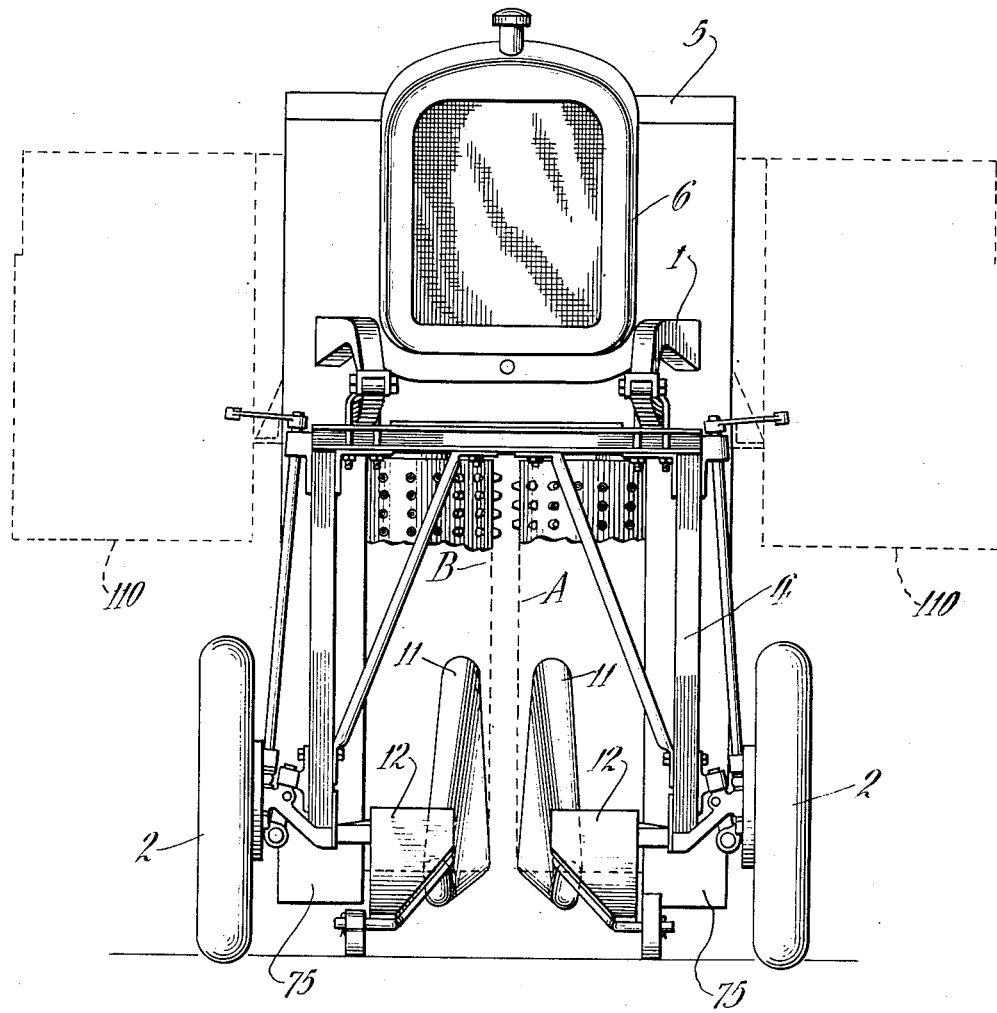

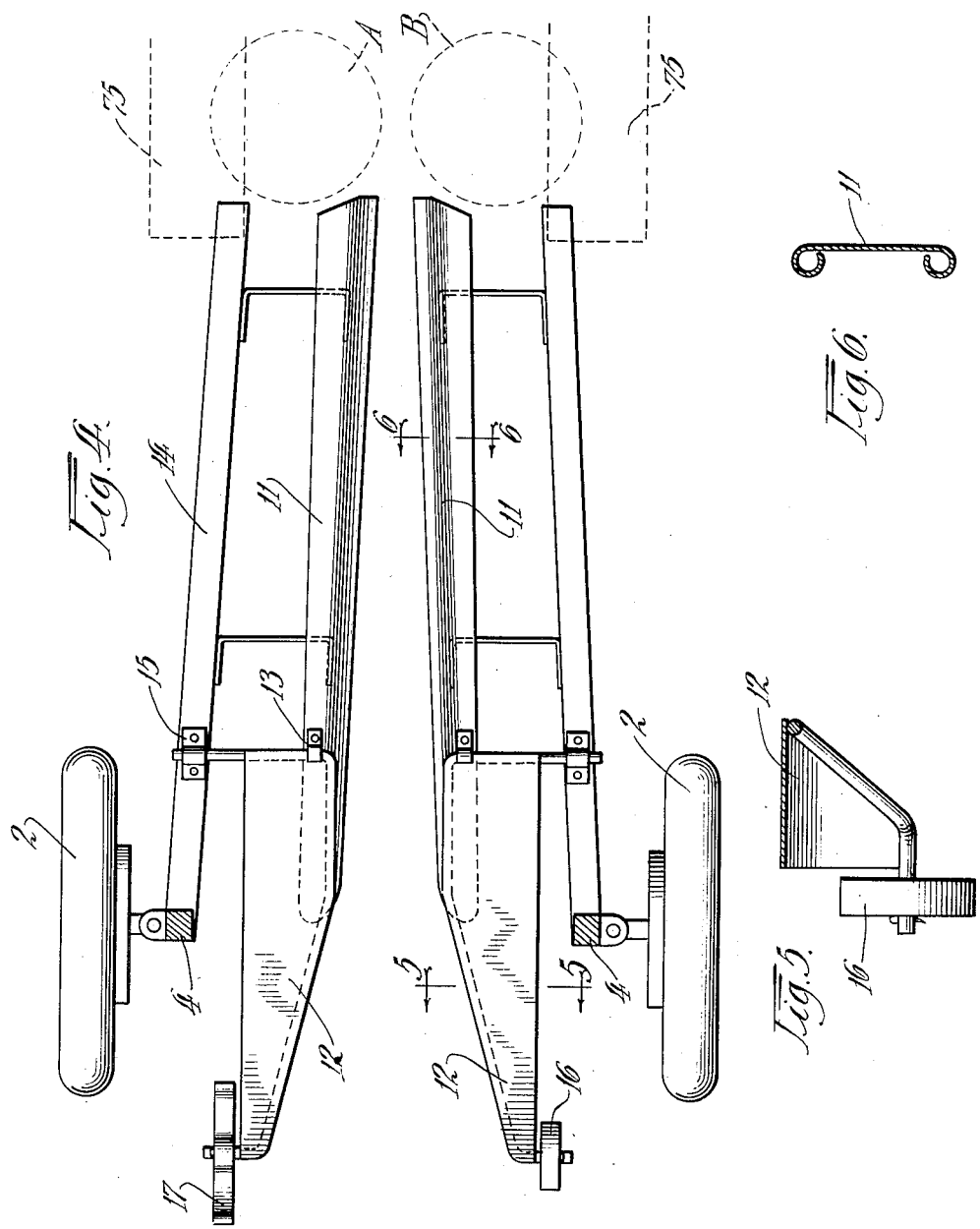

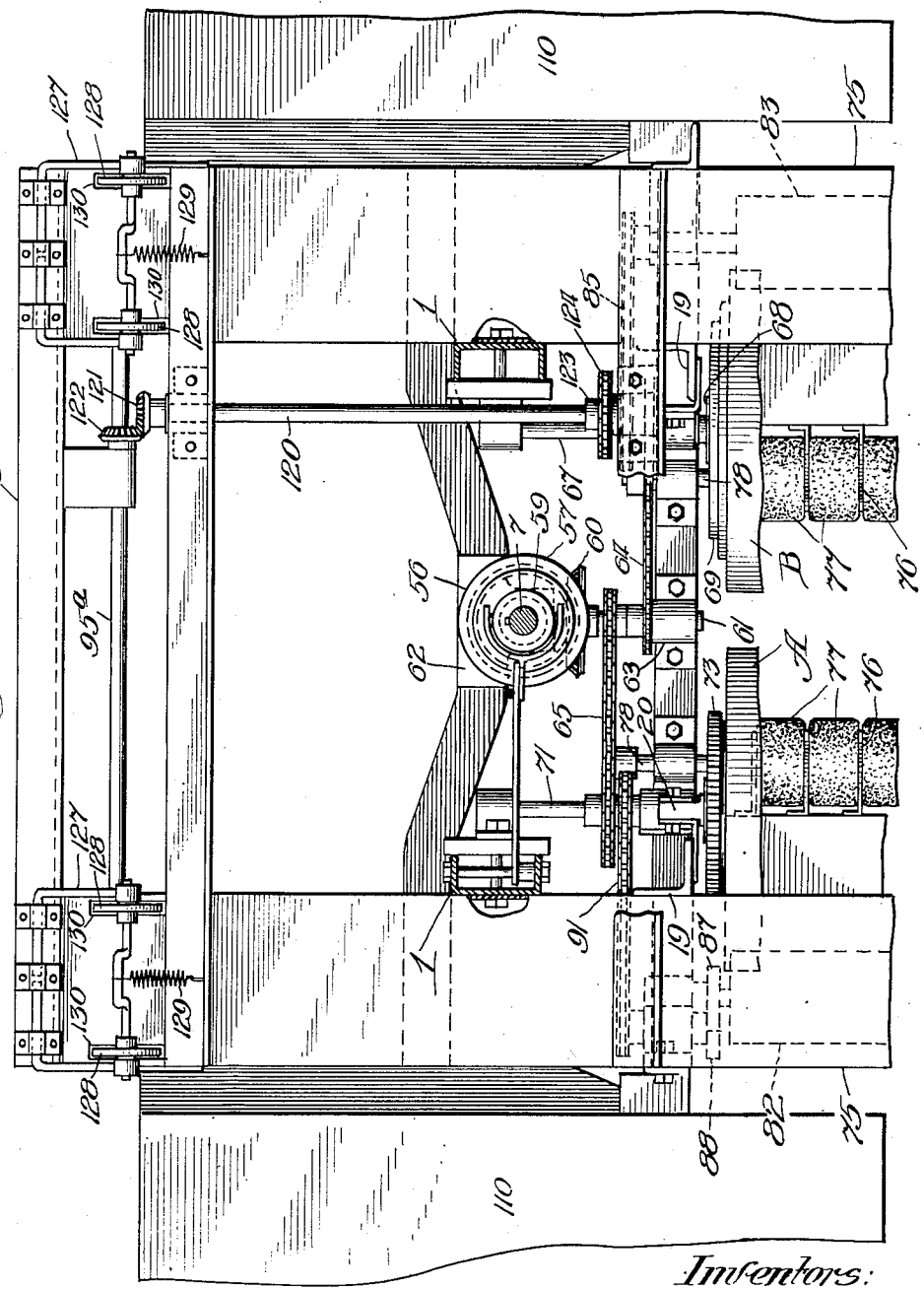

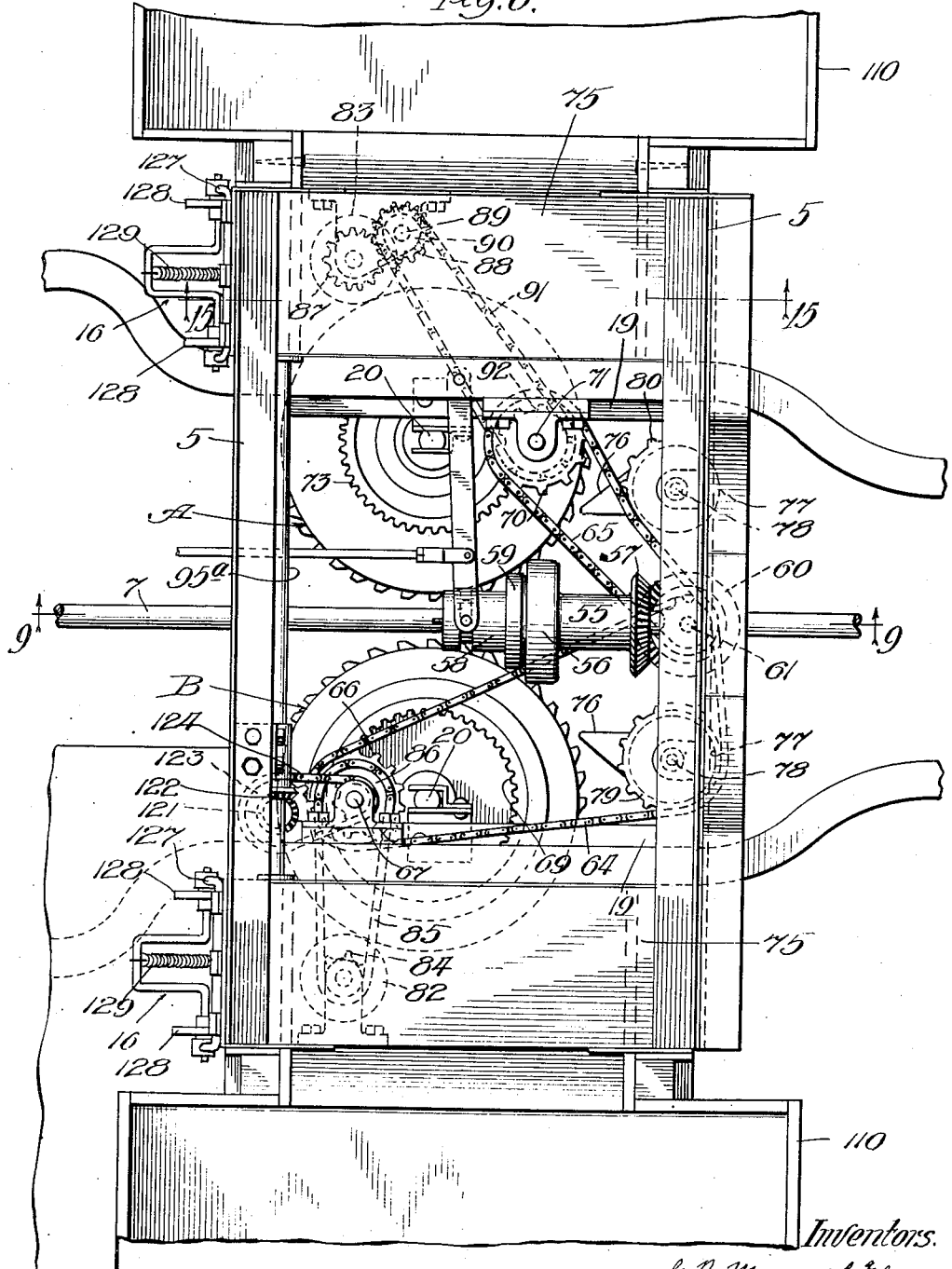

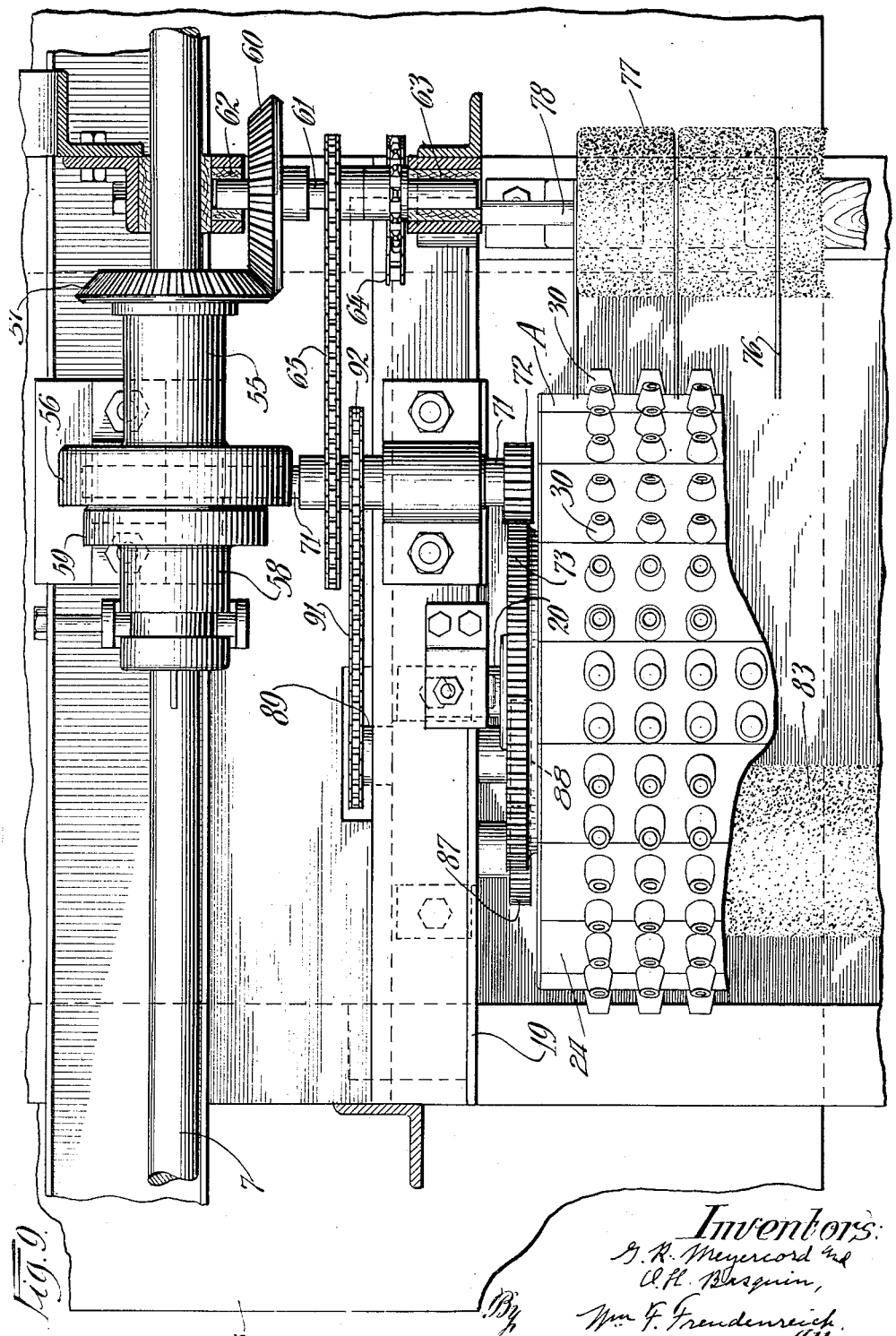

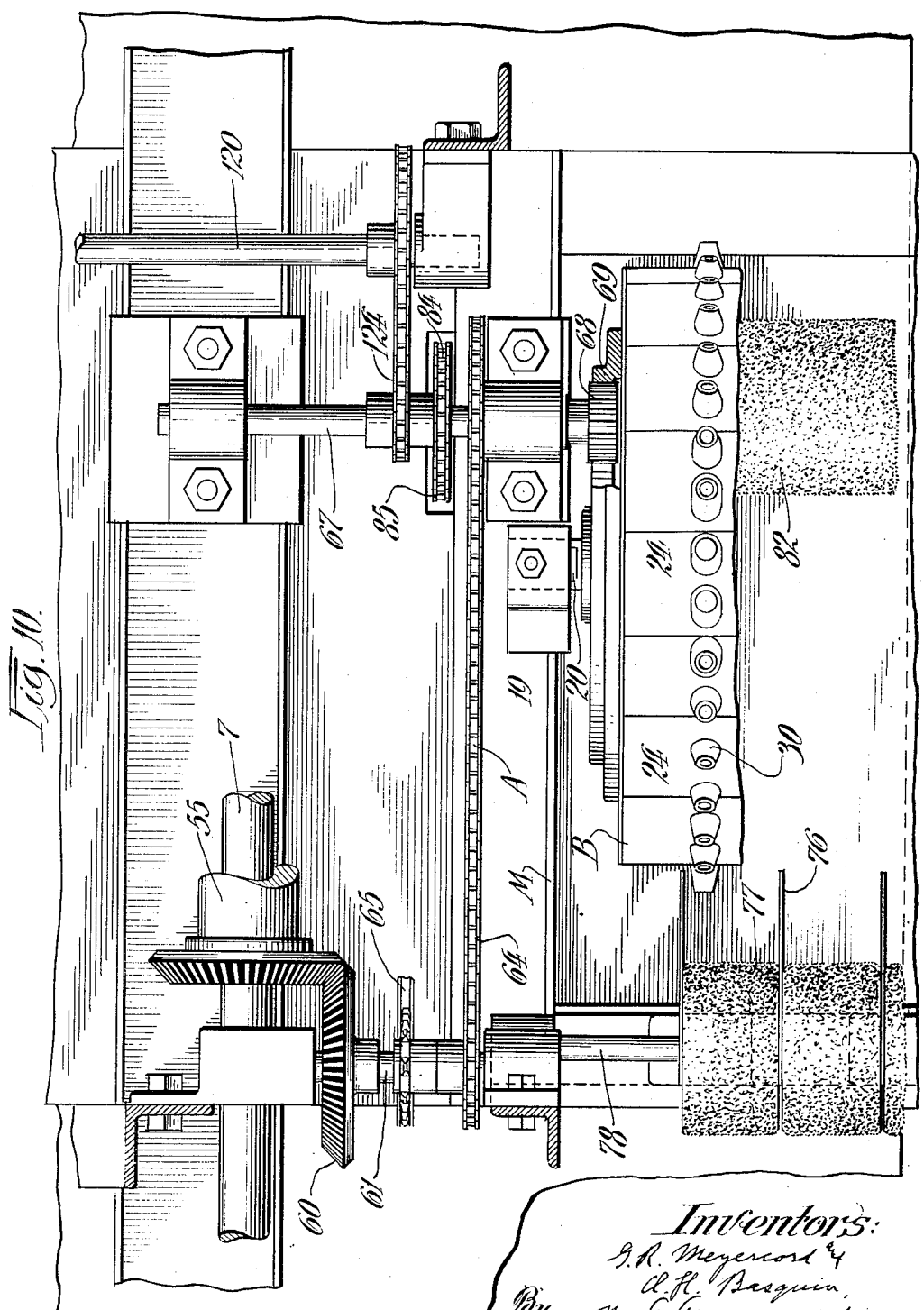

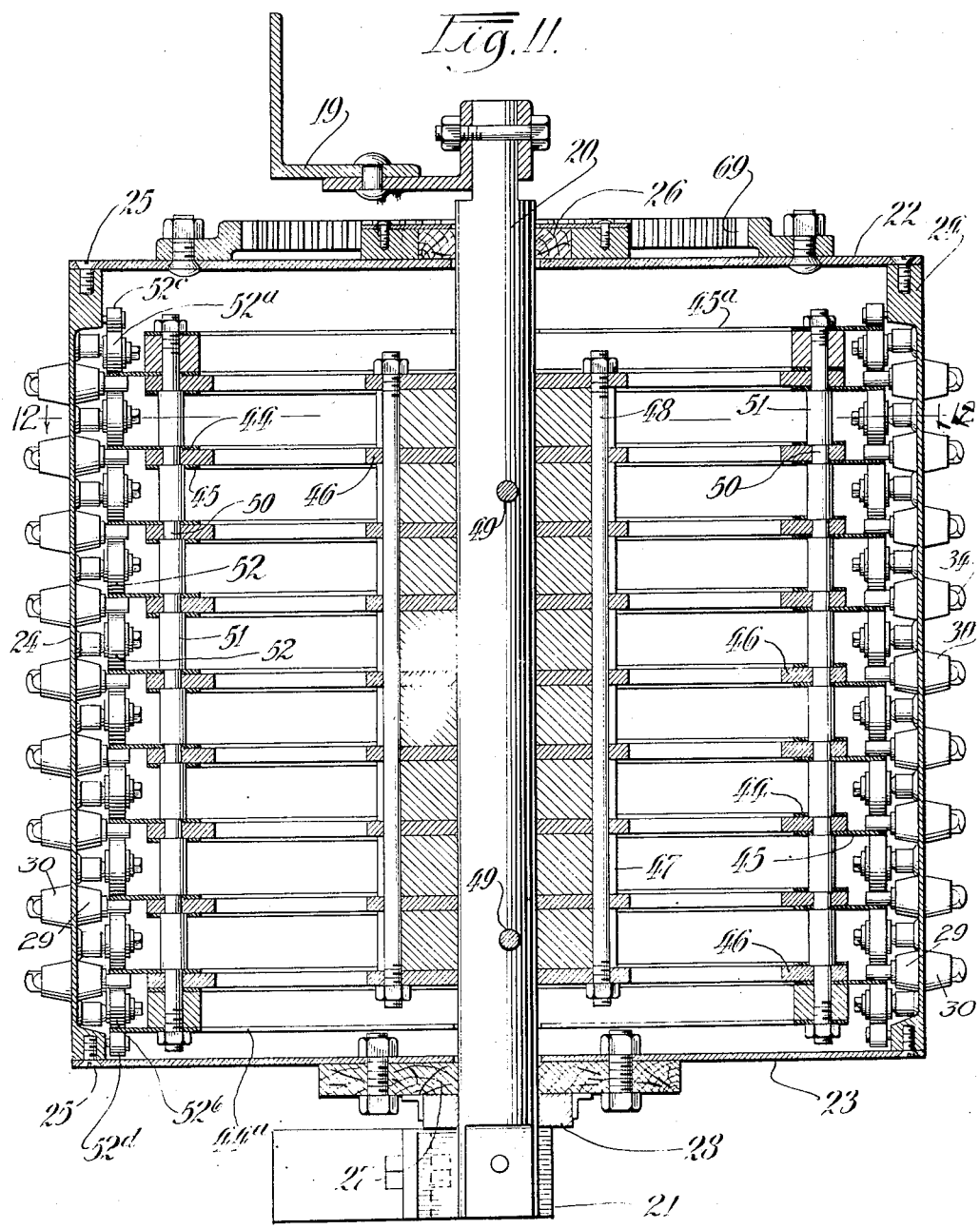

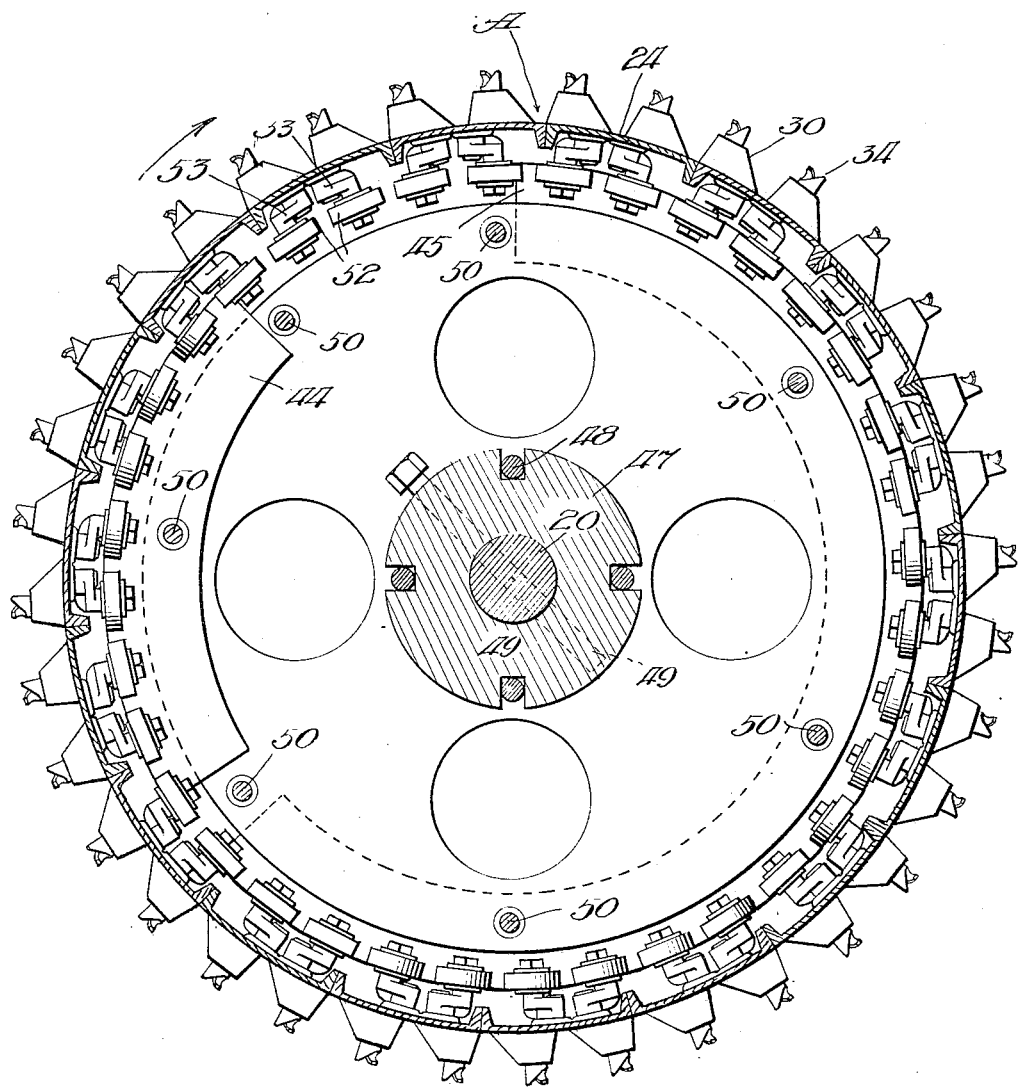

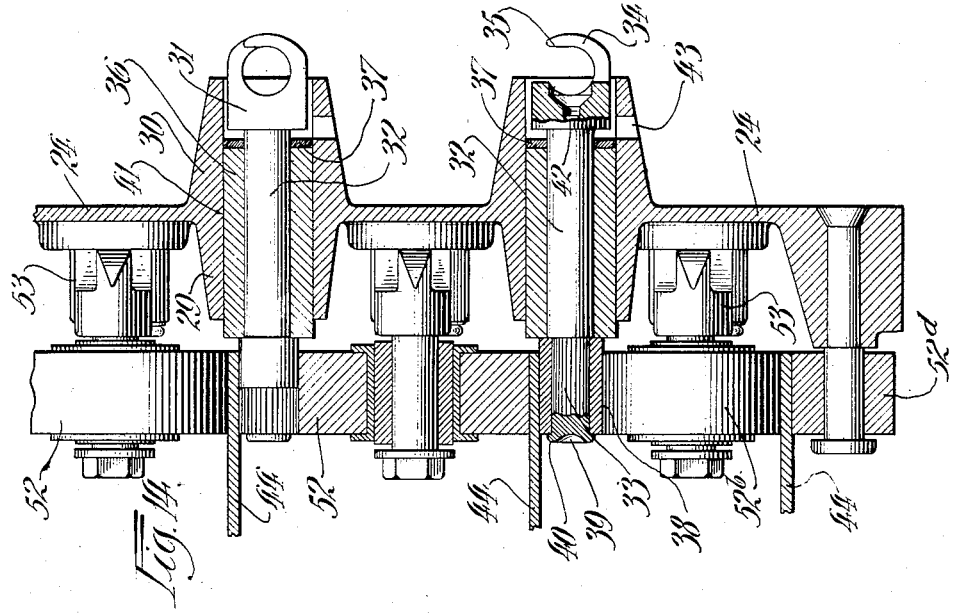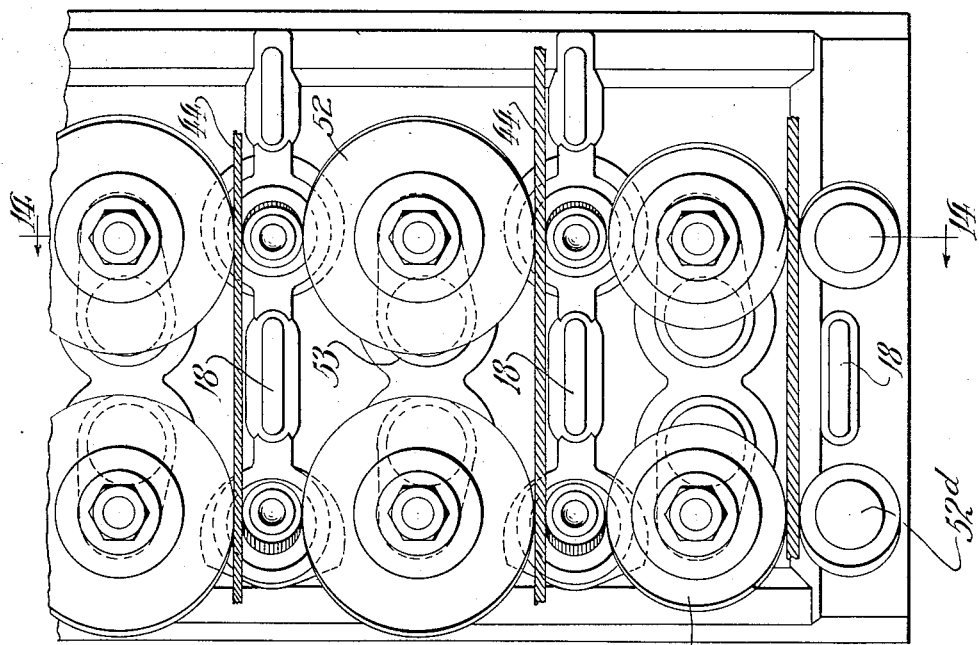

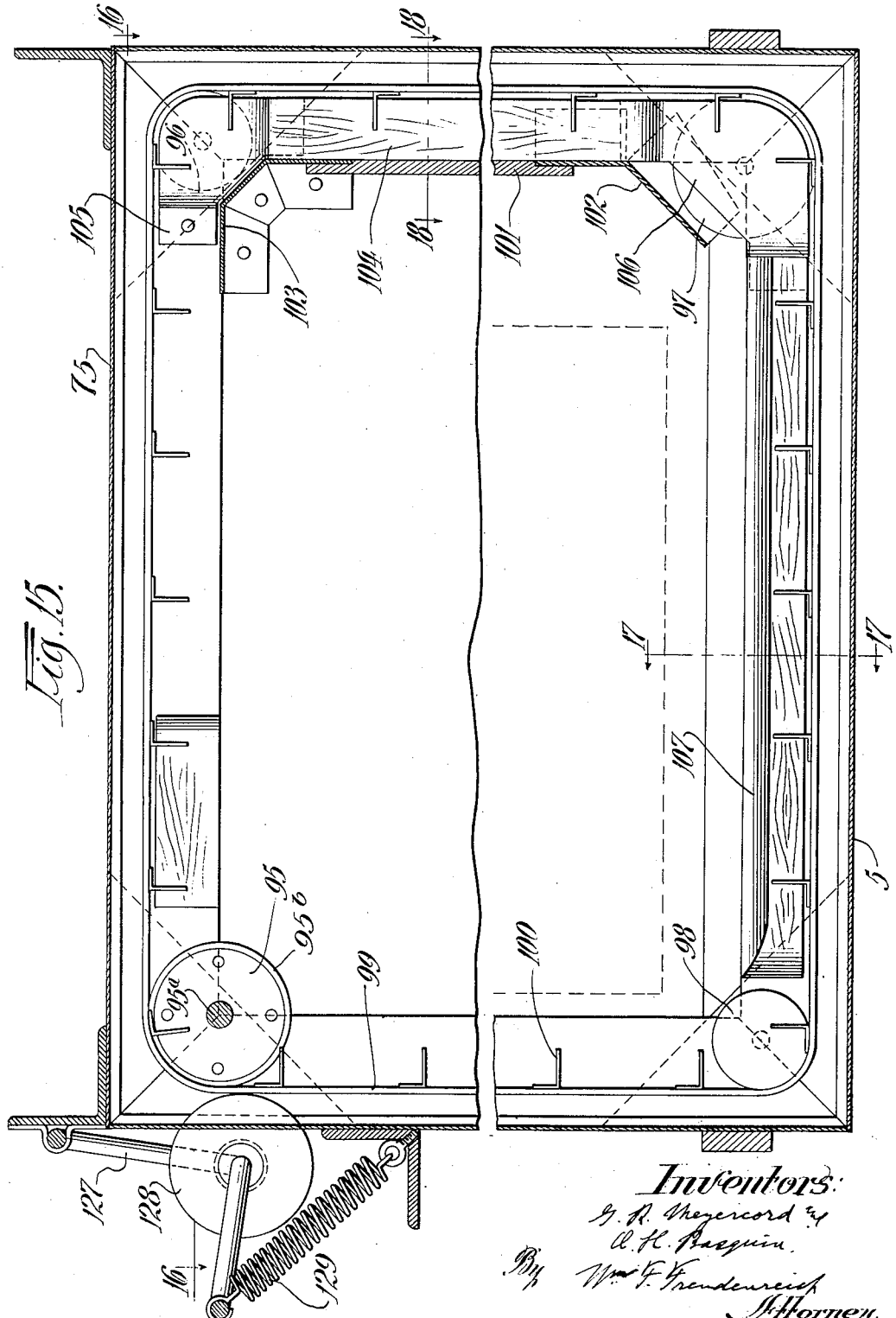

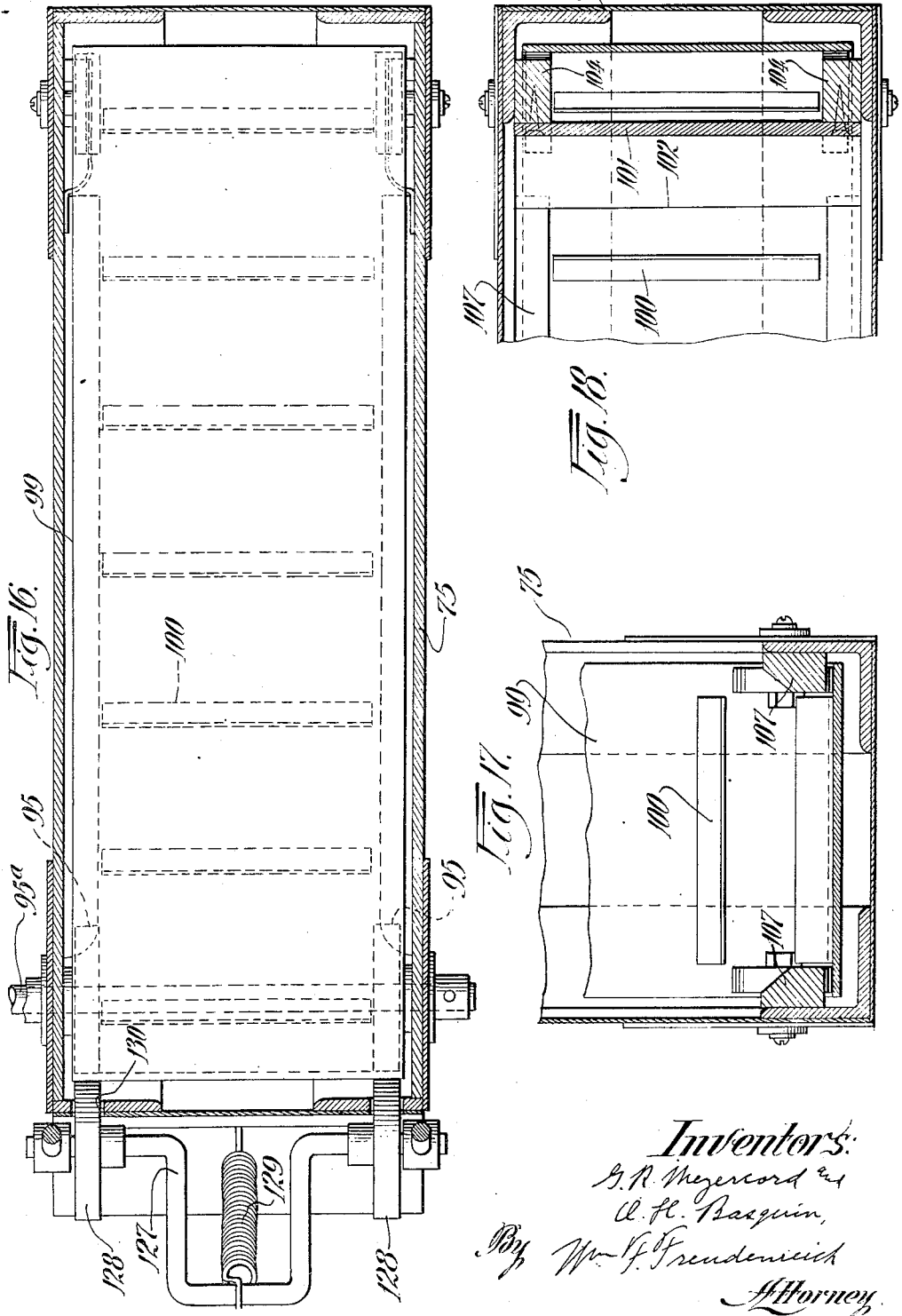

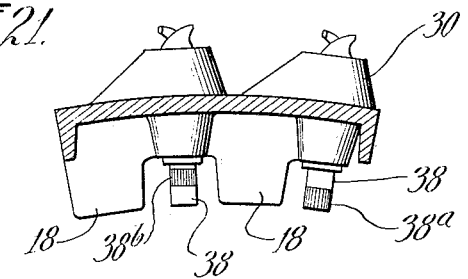
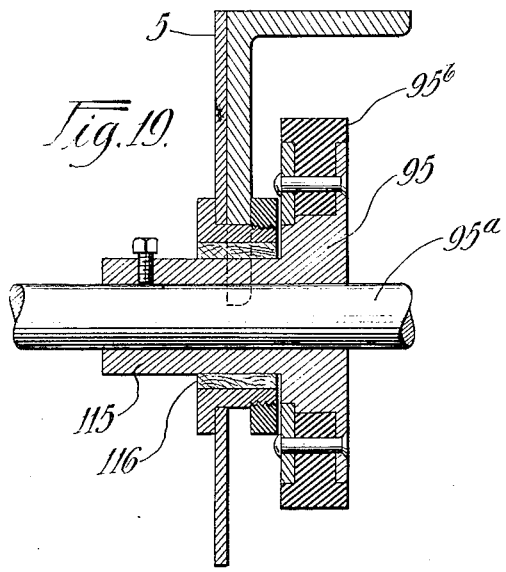
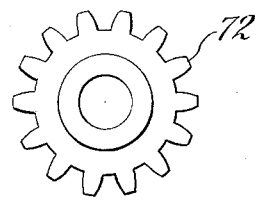
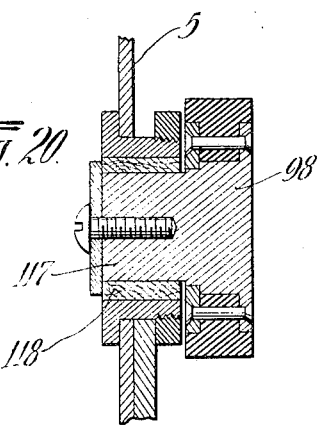
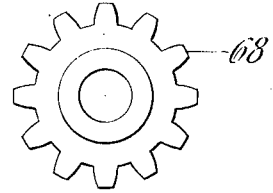

Patented Sept. 22, 1931

1,824,223

UNITED STATES PATENT OFFICE

GEORGE R. MEYERCORD, OF CHICAGO, AND OLIN H. BASQUIN, OF EVANSTON, ILLINOIS, ASSIGNORS TO GEO. R. MEYERCORD AND ASSOCIATES, A CORPORATION OF ILLINOIS

COTTON HARVESTING MACHINE

Application filed February 18, 1929. Serial No. 340,836.

The present invention has for its object to produce a simple machine of low weight that may be driven rapidly through a cotton field and effectively pick a large percentage of the cotton, comparatively free from foreign matter without injuring the cotton plants and without danger of getting lubricating oil on the cotton fibre.

In carrying out our invention we employ vertical rotary drums having thereon picking elements rotatable about their own axes, first in one direction and then the other for picking and doffing, respectively. In carrying out this feature of our invention, we employ stationary segments within the drums, which segments engage with the inner ends of the picker elements or parts associated therewith, so as to cause such elements to rotate first in one direction and then in the other. Viewed in one of its aspects, the present invention may be said to have for its object to produce a simple and novel construction and arrangement that will insure the effective rotation of the picker units without requiring expensive machine work and extreme accuracy in adjustment in the construction and assembly of the segments.

It is desirable that the picker units project as little as may be from the drums so as to reduce the danger of bending the elements or their immediate supports in service. Viewed in one of its aspects, the present invention may be said to have for its object to produce a simple and novel cotton harvesting machine which will manipulate the cotton plants so as to bring the cotton bolls close to the drums so that picking devices projecting only a short distance from such surfaces will be brought into contact with the cotton.

For the purpose of carrying out this latter feature of our invention, means must be provided for lifting the lower limbs of the cotton plants and swinging these as well as the higher limbs toward a vertical plane extending longitudinally of the machine between the drums and from both sides of such plane. The simplest means for lifting the limbs and grouping them in a narrow place consists of stationary shoes high at their rear ends and decreasing gradually in height and diverging from each other toward their front ends. However, the ground is uneven and pointed shoes of this type that extend down far enough to lift the lowermost limbs, might gouge into the ground sufficiently at times to stop the machine. At any rate, the points of the shoes, if low enough to pass under the lowermost limbs, would plow through the dirt and, in the case of a wet field, would lift mud into contact with the cotton. Viewed in one of its aspects, the present invention may be said to have for its object to provide a simple means whereby the lowermost limbs will be effectively guided into operative relation to fixed shoes independently of the pointed front ends of the shoes; whereby the latter are left free to plow through dirt or mud, if necessary, without permitting the dirt or mud to come in contact with the cotton.

The picker units should be low enough to reach the lowermost bolls. However, where the cotton is discharged upon conveyors that carry it away, the lower ends of the drums must be high enough up to permit the conveyors to lie at a lower level. A further object of the present invention is to produce a simple and novel conveyor system that will extend very little below the bottom of the drums; thus permitting the drums to be set low enough to reach the lowermost cotton.

Further objects of the present invention are to produce a simple and novel drum construction that will permit a group of picker units to be readily detached without disturbing the remainder of the mechanism and without affecting the relation of the units of that group with each other; and to produce a simple and novel self-contained picker unit including a bearing that requires no oil to lubricate the same, which unit may easily be removed and replaced.

Further objects of the present invention are to provide a simple means for deflecting trash that would otherwise be carried by the drums to the conveyors to which the cotton is to be delivered; and means for automatically polishing the picking ends of the picker elements during the operation of the machine, whereby the cotton will freely leave the picker elements when the latter are moved in the proper direction to discharge the cotton.

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

Figure 1 is a side elevation of a machine arranged in accordance with our invention, many of the parts not required for an explanation of the invention being omitted; Fig. 2 is a rear view of the machine; Fig. 3 is a front view of the machine, parts being omitted and their locations being indicated by dotted lines; Fig. 4 is a section taken approximately on line 4—4 of Fig. 1; Fig. 5 is a section on line 5—5 of Fig. 4; Fig. 6 is a section through one of the lifters on line 6—6 of Fig. 4; Fig. 7 is a section on an enlarged scale on line 7—7 of Fig. 1; Fig. 8 is a top plan view of the rear portion of the machine on the same scale as Fig. 7; Figs. 9 and 10 are views, on a still larger scale, looking in opposite directions, respectively, from line 9—9 of Fig. 8; Fig. 11 is a vertical section through one of the picker drums; Fig. 12 is a section on line 12—12 of Fig. 11; Fig. 13 is a view on a greatly enlarged scale, of the inner side of the lower portion of one of the slabs composing the drums, fragments of the stationary driving segments being shown; Fig. 14 is a section taken approximately on line 14—14 of Fig. 13; Fig. 15 is a section taken approximately on line 15—15 of Fig. 8, on a larger scale than Fig. 8; Fig. 16 is a section taken approximately on line 16—16 of Fig. 15; Fig. 17 is a section taken approximately on line 17—17 of Fig. 15; Fig. 18 is a section taken approximately on line 18—18 of Fig. 15; Figs. 19 and 20 are respectively longitudinal sections through one of the bearings for a conveyor driving shaft and for a conveyor idle shaft; Fig. 21 is a section showing a fragment of the drum and two adjacent picker elements; Figs. 22 and 23 are plan views of corresponding driving pinions associated with the two drums, showing that they do not have the same number of teeth; Figs. 24 and 25 are views showing the inner side of the upper portion of a slab carrying a modified form of picker element, showing the means for rotating the latter in opposite directions; Fig. 26 is a section taken on line 26—26 of Fig. 24; Fig. 27 is a section, on an enlarged scale, on line 27—27 of Fig. 24; and Fig. 28 is a section on line 28—28 of Fig. 27.

Briefly stated, the machine illustrated in the drawings comprises an ordinary automobile chassis with the wheels dropped down and connected to each other and to the main frame by a framework that leaves a wide high passage extending through the longitudinal center of the structure. Therefore when the machine is driven through a field it will straddle a row of cotton plants. Projecting into this pasage, from opopsite sides thereof, are two vertical drums spaced only a short distance apart and driven in such direction that the points of the drums nearest each other will be travelling backward while the machine is moving forward. The drums are provided with picker elements adapted to collect the cotton fibre from the plants, as the latter pass between the drums, and afterwards discharge the cotton into conveyor chambers at the sides of the machine outwardly from the drums. Suitable means are provided to lift the limbs of the cotton plants and guide them between the drums.

Referring to the drawings, 1 represents the elevated frame of the machine, 2, 2 the front wheels and 3, 3 the rear wheels. The front wheels are supported on the lower ends of the arms of a frame 4 in the form of an inverted U, while the rear wheels are supported by the lower ends of the arms of a U-shaped structure whose arms 5, 5 constitute conveyor chambers. The machine, as shown, has a rear wheel drive. The engine, not shown, is mounted in the hood above the front end of the upper frame 1. The drive shaft 7 of the engine extends to the rear of the machine to a differential axle 8. Suitable drive chains 9 extend down from the ends of the differential axle to the two rear wheels, these chains being enclosed by suitable housings 10.

The conveyor housings in their lower halves are open on the inner sides and, projecting partially into the open sides of the housings, are two vertical drums that may be indicated as a whole by A and B, respectively. These drums are spaced only a short distance apart.

It is necessary that the cotton plants be properly guided, and the lower limbs lifted, into the space between the drums, without injury to the plants, as the machine is driven through the field. To this end we have provided two stationary shoes 11, 11 extending from the front end of the machine rearwardly into proximity with the drums. These shoes diverge gradually and decrease in height from their rearward toward their front ends. It is not practicable to bring the front ends of the shoes low enough to permit them to pass underneath low lying limbs of the cotton plants before the latter are reached by the front vehicle wheels, and therefore we provide the stationary shoes with extensions or auxiliary shoes. These auxiliary shoes are best shown in Figs. 1 and 3 to 5. As there shown, they may consist conveniently of light, comparatively wide flat members 12 each hinged at its rear end to one of the stationary shoes, as indicated at 13, and to one of the lower longitudinal frame members 14, as indicated at 15, so as to be capable of swinging up and down. At the front end of each auxiliary shoe is a suitable ground support that may take the form of a roller or a wheel 16 or of a skid 17. The auxiliary shoes may therefore swing up and down in accordance with the configuration of the surface over which they are travelling; their front ends or noses therefore being always in position to pass underneath the lowermost limbs of a cotton plant. The auxiliary shoes are so shaped that their inner edges diverge rapidly toward their front ends, so as to provide a wide flaring mouth to guide the plants into the space between the stationary shoes which, in turn, guide the plants into the space between the drums. As the machine travels past a plant, the latter is not only guided or centered with respect to the machine, but its limbs or branches are gradually lifted and swung upwardly until all of them are approximately upright when they reach the drums.

The details of the drums and of the picking elements thereon are best shown in Figs. 11 to 14. The two drums are similar that is, one may be called a right and the other a left, and a description of one will suffice for both. Depending from a suitable part of the elevated framework of the machine, in this instance, longitudinal beams 19, 19, are two stationary vertical shafts 20, 20, braced against swinging movements by brackets 21 extending from the lower framework. Each drum, as shown, comprises an upper circular head 22 and a lower circular head 23. These heads are connected together by a series of vertical slabs 24 placed edge to edge to form the cylindrical surface of the drum. In the arrangement shown, screws 25 pass through the heads into the ends of the slabs. Upon the removal of the screws going into a slab from the top and the bottom, the slab may be removed without disturbing any other portion of the mechanism. In a sense, therefore, the upper and lower heads of the drum may be regarded as a body or structure to which the slabs are attached. The shaft 20 extends down through both heads which are provided with suitable bearings 26 and 27 whereby the drum is rotatably supported on the shaft. The elements that form the bearings proper are made of some material that does not require oil, in the operation of the machine, to lubricate the same. Hard wood boiled in paraffin and removed from the latter only after it has been at least partially cooled, will serve the desired end. The bearing piece 27 rests on a collar 28 fixed to the shaft and serving to support the weight of the drum.

Each drum is provided with numerous circumferential rows of picker elements. As shown in Fig. 2 the rows on one drum are displaced vertically with respect to those of the other drum, so that the plane of each row on one drum lies midway between the planes of two rows on the other drum. The walls of the slabs on the drums are made comparatively thin for the sake of lightness, but it is desirable that the picker elements have long bearings and that only a small portion of each shall project beyond its bearing. Therefore each slab is provided with registering inner and outer bosses 29 and 30, respectively, wherever a picker element is to be located.

The picker element illustrated in the drawings consists of a head 31 fixed to or integral with one end of a cylindrical stem 32 having at the free end a short section 33 of reduced diameter and preferably roughened on the surface. In making the device, the head first takes the form of a cylindrical block. A hole is drilled lengthwise of the head through the end of the head, and another hole is drilled crosswise through the head near the outer end. Two deep diagonal cuts are then made through the head, 180° apart, these cuts extending through the cylindrical block and transforming it into two hooks 34 pointed at their outer ends and increasing gradually in width toward their inner ends or bases. As a matter of fact, the angular width of the base of each hook is approximately 180°. The free ends or points 35 of the hooks are then bent inwardly somewhat toward the long axis of the device and are also bent downwardly somewhat. The downward curve of the free ends of the hooks is emphasized by cutting away the upper or outer faces.

The picking elements, which are present in large numbers in a complete machine, can be made very quickly and cheaply in the manner just described, and yet be very uniform in shape.

When one of these picker heads is moved against a cotton plant and is rotated in a direction tending to screw the hooked prongs into an object encountered thereby, it will be found that the end of the head acts very much as though it were a round, polished knob when coming in contact with a leaf or a stem. However, when the head meets a mass of fibre protruding from the boll, it readily enters the same and takes an effective grip thereon. When the picker element and the boll are moved apart, while the former is still rotating, the fibre will be pulled out from the boll. Then, when the direction of rotation of the picker element is reversed, the peculiar shape of the prongs permits the cotton to fly off readily, so that the cotton is automatically discharged by the mere act of reversing the direction of rotation of the picker element after it has collected the cotton from the plant. Consequently a cotton plant will not be injured when scanned by our improved picker heads and green leaves will not be readily picked along with the cotton fibre.

Surrounding the stem of the picker element is a sleeve 36 of such material or so designed that no oil need be applied to lubricate the bearing. Hard close grained wood, preferably boiled in paraffin will serve. There is preferably a washerlike part of felt 37 between the inner end of the head of the picker and the adjacent end of the bearing sleeve. On the end section 33 of the stem is fitted a hard sleeve 38 adapted to engage with a suitable driving member for rotating the finger. The member 38 is a tight fit on the stem, the roughness of the surface of the part 33 of the stem contributing to the tightness of the fit when the sleeve 38 is driven or pressed on. Initially the free end of the part 33 of the stem contains a recess or depression 39, providing a comparatively thin annular flange or lip that may conveniently be expanded, as indicated at 40, to secure a rivet effect without requiring the element to be subjected to forces that might bend it.

The head of the picker element is smaller in diameter than the bearing sleeve 36, and so is the sleeve 38. Consequently each picker unit with its bearing sleeve and driving sleeve may be completely assembled and then be bodily pressed into the hole or bore 41 extending through two of the registering bosses on one of the slabs. Furthermore, since the particular picker units illustrated are simply frictionally held in the wall of the drum, any complete unit may be pushed back somewhat upon encountering an obstruction in the field, without breaking or damaging it. In other words, the friction between the sleeve and the surrounding support is sufficient to hold the sleeve stationary under normal conditions, but is not great enough to resist a blow or a thrust considerably less than that required to damage the prongs on the picker finger.

The parts are so proportioned that when the picker units are assembled in the walls of the drums the heads on the picker elements project into the openings 41 far enough so that a considerable portion of each prong or hook, at the base of the latter, lies within the bore in the corresponding boss, only a portion of each prong projecting beyond the boss. Each picker element is preferably provided with means adapted to be engaged by a tool to permit the unit to be readily withdrawn when, for any reason, this is desirable. In the arrangement shown, there is a tapped hole 42 in the outer end of each head, in the space between the prongs. In order to remove a unit from the drum, a simple pulling tool may be screwed into the tapped hole in the outer end of that unit; the unit being then withdrawn by exerting a pull on the tool.

Foreign matter may enter the opening or bore 41 around the sides of the picker finger head. In order that such foreign matter may escape without entering the bearing, we provide a discharge outlet or port 43 which extends from the bore 41, at the rear end of the picker head, down through the bottom of the boss 30. Consequently, any dirt or other foreign matter that passes in behind the head will work its way out through the hole or port 43.

As best shown in Fig. 12, the bosses 30 have a more gradual slope on the advance faces than on the opposite sides, so as to eliminate any tendency to carry limbs of the cotton plant along.

The slabs may conveniently be made of such width that each slab will carry two picker units of each row.

The picker elements are rotated directly or indirectly from stationary members arranged in the drums, along which stationary members the picker elements must pass. In the arrangement shown, these members consist of segments arranged in pairs lying one above the other. The uppermost segment of each pair is in approximately a horizontal plane tangent with the tops of the rollers at the inner ends of the picker elements in one of the circumferential rows, while the lower segment lies in approximately the horizontal plane tangent to the bottoms of the same rollers. The upper segments, 44, are comparatively short, while the lower segments, 45 are preferably more than 180° long. Viewed from above, the upper segments are spaced apart only a short distance from the lower segments, at one end; whereas a gap greater than the width of one of the slabs exists between the other ends of the two sets of segments. The segments are so mounted that as the drum is revolved about them, the upper set of segments and the lower set alternately engage with the driven rollers on the picker elements, causing the picker elements to be rotated alternately in opposite directions. In the zone where the wide gap occurs the picker elements are free, so that whenever a slab reaches this zone, it may be removed and replaced without otherwise changing any of the conditions in or about the drum.

It would be difficult and costly accurately to fit rigid segments and rigid rollers so as properly to operate the picker units and, for this reason, we prefer to employ segments that are flexible. The segments are mounted on what may be termed a multiple spider consisting of a series of rigid discs 46 surrounding the shaft 20 and separated from each other by suitable spacers 47. Vertical bolts 48, passing through the discs and spacers hold them together; whereas bolts or pins 49, passing through one or more spacers and through the shaft 20, secure the entire spider arrangement to the shaft. The discs are of such a diameter that their peripheries are spaced only a short distance from the inner ends of the picker elements; each disc being of course in the plane of a row of such elements. The upper segments lie on top of the discs and the lower segments lie against the under faces of the discs. Because of the nearness of the discs to the picker elements, the segments need project only a short distance from the discs in order to extend into the paths of travel of the rollers on the inner ends of the picker elements.

Further rigidity is given to the supporting structure for the segments by a number of bolts 50 extending vertically through the structure, near the periphery of the discs, so as to pass through the flexible segments. Surrounding the bolts 50, between the discs, are spacers 51 that may assist also in holding the segments in place.

It is not sufficient for the rollers on the picker elements to overlie or underlie the segments while in contact therewith during their travels past the segments, but some means must be provided to press the segments and the rollers together.

In the arrangement shown there is located between the inner end of each picker element and the inner end of the corresponding picker element in the next row, a wheel 52. Each wheel is journalled on the free end of a substantially horizontal arm 53 pivoted to the wall of the drum so as to permit the wheel to move up and down into contact with either the upper or the lower roller. The parts are so proportioned that when the inner ends of the picker elements are travelling underneath and in contact with the upper segments, as shown in Figs. 13 and 14, they ride underneath the corresponding wheels 52 and force these wheels up into engagement with the overlying rollers. In other words, each roller will be driven through direct contact with a segment overlying it, and indirectly from another segment through one of the wheels 52. The action is just the same when the segments 45 come into play, except that the wheels 52 are pressed down by the segments 45, instead of up. On the inside of the cylindrical wall of the drum we place lugs or projections 18 of considerable width; the lugs alternating with the picker elements in each row. The purpose of these lugs is simply to prevent the segments from dropping down in the spaces between the picker elements over which they pass, and to prevent the lower set of segments from jumping up. In other words, the advance ends of the segments are effectively guided so that no segment can thread its way over one roller and under the next. Even though the segments are flexible, there must be an elastic or yielding character throughout the entire drive for the picker elements, in order to obviate the necessity of extremely accurate machine work. To this end, the rollers 38, the segments, or the wheels 52, or more than one of these different sets of elements, must be made elastic to compensate for small variations in dimensions and positions. The desired results may ordinarily be obtained by making the wheels 52 of rubber, thus permitting the rollers 38 to be of hard material and the segments of any suitable desirable material; but we do not wish to limit ourselves to this specific arrangement. We have found that segments made of material such as employed for rubber belting give satisfactory results.

In addition to the wheels 52 lying between the rows of picker elements, we provide additional wheels $52^a$ and $52^b$ above the uppermost row of picker elements and below the lowermost row of picker elements, respectively. Overlying each wheel $52^a$ is an idler wheel $52^c$ and, underlying each wheel $52^b$ is an idler $52^d$. An additional stationary segment $45^a$ is provided at the top of the drum in position to enter between the wheels $52^a$ and $52^c$; this segment corresponding to the segments 45. At the bottom of the drum is another additional segment $44^a$, corresponding to the segments 44, and adapted to enter between the wheels $52^b$ and $52^d$.

Assuming that the machine as a whole is travelling toward the top of the sheet in Fig. 12, and that the drum is revolving in the clockwise direction, each picker element will begin to rotate in a direction to pick cotton at about the time when it is pointing straight ahead, and will continue to rotate in this direction until it has travelled with the drum through an arc of more than 180°. The proper upper segment 44 then comes into play and causes the rotation of the picker to be reversed while the latter is travelling through a considerable angle; thus allowing time for the cotton to be discharged from the element. This discharged cotton, as will hereinafter be explained, collects on a conveyor that removes it to a delivery point.

The drums may be driven by any suitable mechanism, conveniently from the main drive shaft 7 as shown in Figs. 7 to 10. Referring to these figures, it will be seen that there is on the main shaft a loose sleeve 55 having on one end one element 56 of a clutch, and on its other end a bevel gear 57. Slidable on the shaft, but rotatable therewith, is a second sleeve, 58 provided with a clutch element 59 complementary to the clutch element 56. The gear wheel 57 meshes with a complementary wheel 60 fixed to a short vertical shaft 61 that is mounted in bearings 62 and 63 that require no oil to lubricate them while in service. The wearing elements of the bearings may therefore be sleeves of wood boiled in paraffin or of any other material suitable for the purpose. On the shaft 61 are two sprocket wheels over which run sprocket chains 64 and 65 respectively. The sprocket chain 64 passes over a sprocket wheel 66 fixed to a vertical shaft 67 above and at some distance from the vertical axis of the drum B.

On the lower end of the shaft 67 is a pinion 68 meshing with an internal gear 69 fixed to the upper head 22 of the drum B. The chain 65, on the other hand, passes over a sprocket wheel 70 fixed to a shaft 71 arranged above the drum A and at some distance from the axis of that drum. On the lower end of the shaft 71 is a pinion 72 meshing with an external gear 73 on the upper head of the drum A. In other words, when the clutch is thrown in, both drums will be rotated, but in opposite directions due to the fact that the final element of the driving mechanism for the drum B is an internal gear while the corresponding element on the drum A is an external gear. Furthermore, the directions of rotation and the gear and sprocket wheel ratios are such that as the machine moves ahead under its own power the portions of the two drums nearest each other are rotating backwards, preferably at about the speed at which the machine is travelling ahead.

We prefer that the drums rotate at different speeds so that a plurality of limbs or branches enter between the drums, the latter will act in a manner to spread them more or less in the direction of the long axis of the machine. This result can be accomplished by giving one of the pinions 68 and 72 more teeth than the other. Thus, for example, as shown in Fig. 22, the pinion 72 may have fourteen teeth, whereas, as shown in Fig. 23, the pinion 68 may have twevle teeth. It makes no difference which drum revolves the more rapidly, and the pinion 68 might therefore have more teeth than the pinion 72.

As the machine travels through the field and the cotton plants are passed between the drums, the picker elements into whose paths the cotton plants come will be revolving in a direction to withdraw from the bolls any cotton with which they may come into contact. Each picker, with its load of cotton, continues to revolve until it has been carried to the side of the machine; whereupon the direction of rotation of the picker will be reversed and the cotton will be automatically discharged. We therefore place at each side of the machine, adjacent to the corresponding drum, a chamber or housing 75 closed at the top and bottom and on all four sides, except the inner side, which is open to permit a considerable section of the adjacent drum to project into the same. In other words, all those picker elements lying in the zone of the segments 44 must be within the chamber or housing so that all of the cotton that is discharged by the pickers while rolling along the segments 44, will be recovered.

In order as far as possible to prevent trash from being carried around with the drums into the cotton receiving chambers, we provide a series of clearing fingers 76, shown in plan in Fig. 8 and as heavy black lines in Fig. 2. These fingers lie in rear of the drums, with their forward ends comparatively close to the drums. Fingers made of flat plates, more or less pointed, and laid with their flat faces horizontal, have been found to give satisfactory results. Further aid in clearing away the trash may be obtained from vertical rotatable brushes 77 lying behind the drums. In the arrangement shown, each brush is made in a number of sections mounted upon a vertical shaft 78 extending through the rear ends of the clearing fingers, as best shown in Figs. 9 and 10. By rotating these brushes in the same direction as the drums, any trash that slides along the clearing fingers into contact with the brushes, will be thrown rearwardly and toward the longitudinal center line of the machine, that is away from the receiving chambers for the cotton. In order to drive the left hand brushes, we provide the shaft for the latter with a sprocket wheel 79, and pass the sprocket chain 64 over this wheel. In the same way, the shaft for the right hand brushes is provided with a sprocket wheel 80 engaged by the sprocket chain 65. Therefore, whenever the drums are being driven, the clearing brushes are also driven. Provision is also made to prevent stems or the like from being carried around by the drums, thereby reducing the amount of work that must be done by the clearing fingers. As best shown in Figs. 12 and 21, the sides of the bosses or projections 30 that are in advance during the operation of the machine slope backward at an angle of thirty degrees or more to the radii of the drums passing through them. If these sides or faces of the bosses were more nearly radial they would constitute shoulders against which stems and other foreign objects would lodge, thereby causing such stems or other objects to be carried along with the drums. By properly sloping the bosses, however, stems and the like will slide off the same and become free.

We have found that it is highly desirable to keep the surfaces on the picker heads polished. This can conveniently be accomplished by placing beside each drum in a zone wherein the pickers are neither picking nor discharging, rotary brush means that will operate on each picker head as it passes, and polish the head. The brushes are preferably so placed that they will engage the picker heads while the latter are still rotating, toward the ends of the discharge zones; thus insuring that all parts of each head will be reached by a brush after the cotton has been thrown from the head. In the arrangement shown, such a brush is placed in the front end of each of the cotton receiving chambers or housings, as indicated at 82 and 83. The vertical shaft on which the brush 82 is mounted has thereon a sprocket wheel 84 over which passes a sprocket chain 85 that runs over a sprocket wheel 86 on the shaft 67. The vertical shaft on which the brush 83 is mounted has thereon a pinion 87 meshing with a pinion 88 on a vertical stub shaft 89. On the shaft 89 is a sprocket wheel 90. A sprocket chain 91 passes over the sprocket wheel 90 and a sprocket wheel 92 on the shaft 71. Therefore, whenever the drums are rotated, not only the clearing brushes, but also the polishing brushes are actuated to perform their intended functions.

The drums should extend down far enough to enable them to pick the lowermost cotton. When this is done there is very little clearance between the drums and the ground. The surface on which the cotton is discharged from the drums must be below the lowermost row of picker elements. If this surface be part of a conveyor that carries the cotton away, another factor determining the elevation of the lower ends of the drums is the kind of conveyor used. In accordance with one feature of our invention, we employ a conveyor construction that has only a single horizontal run or section beside the bottom of the corresponding drum, so that very little vertical space is required for the conveyor in the vicinity of the bottom of the drum. The details of one of the conveyors are best shown in Figs. 15 to 20. In the two upper and in the two lower corners of the conveyor housing are rotary guides indicated respectively at 95, 96, 97 and 98, the axes of rotation being transverse. An endless conveyor belt 99 extends around these guides. On what may be termed the inner side of the belt are vanes 100 projecting at right angles to the adjacent surface of the belt. The guide 95 consists preferably of a shaft 95$^a$ having thereon, adjacent to the inner and outer side walls of the housing, two wheels or pulleys whose peripheral surfaces are comparatively narrow. The guides 96, 97 and 98 may conveniently consist of simple narrow rimmed pairs of wheels, one wheel of each pair being rotatably mounted on each of the opposed side walls of the housing. The vanes are made somewhat shorter than the width of the belt, so that they will pass between the two wheels on each rotary guide. The belt is exposed to the interior of the housing on three sides, namely the top and bottom and one end. Within the housing, and spaced apart from the other end wall of the housing, is a transverse vertical partition 101 between which and the adjacent end wall of the housing the conveyor passes. An extension 102 of the wall 101 extends inwardly across the lowermost rotary guide 97. Another extension, 103, of the wall 101, extends upwardly and then laterally past the rotary guide 96. The chamber or compartment between the partition 101 and the adjacent end wall of the housing is closed at the sides by means of pieces 104 from the upper and lower ends of which project metal plates 105 and 106 that extend past the guide rollers 96 and 97. In the bottom of the housing are two rails 107, 107 overlying the side marginal portions of the conveyor belt, and spaced apart far enough to permit the vanes on the conveyor to pass between them. The plates 106 join the adjacent ends of the rails 107.

As heretofore stated, a portion of each drum projects into the corresponding conveyor housing, and the cotton is discharged from the picker elements while they are within the housing. This cotton falls upon the lower horizontal run of the conveyor, between the rails 107, which, when the machine is in operation, is travelling from left to right as viewed in Fig. 15, as will hereinafter be explained. The cotton is carried along with the conveyor and up into and through the compartment between the partition 101 and the adjacent end wall of the housing, to the top of the housing. After passing the plate 103, there is no longer any support underneath the cotton and the latter drops down to be caught in a receptacle 110 which, as best shown in Fig. 2, has a part projecting into and entirely across the top of the housing just underneath the upper run of the conveyor. There is, of course, one of these receptacles on each side of the machine. If desired, each receptacle may have in the bottom a door 111 that may conveniently be hinged and normally held closed by a hasp 112. When one of the receptacles becomes full, the door may be opened and the contents dumped.

In Fig. 19 we have illustrated one of the bearings for the conveyor shaft 95$^a$. It will be seen that the wheel or pulley 95 has a long hub 115 extending through a sleeve 116 of wood treated so as to be waterproof and self-lubricating, or of other suitable material that will require no oil to lubricate the same. The rim of the pulley is preferably composed of some cushioning material as, for example, rubber, as indicated at 95$^b$.

In Fig. 20 is shown one of the idler wheels 98. This wheel has a hub 117 extending through and rotatable in a bearing sleeve 118, similar to the sleeve 116, also suitably mounted in the wall of the housing. It will be seen, therefore, that none of the bearings of the conveyor need be supplied with oil for the purpose of lubricating the same.

The driving shaft 95$^a$, for the conveyor, may conveniently be driven from some part of the driving mechanism heretofore described. In the arrangement shown, the immediate driving means is a vertical shaft 120 having at the upper end a bevel gear 121 meshing with a complementary gear 122 on the conveyor shaft. On the shaft 120, near the lower end thereof, is a sprocket wheel 123. A sprocket chain 124 runs over this sprocket wheel and over a sprocket wheel 125 on the shaft 67. The result is that when the drums are rotating the conveyors will be running to carry away any cotton that may be delivered to them, since the drive shaft 95ª extends entirely across the machine and serves to drive both conveyors.

The conveyors are driven through the traction between the same and the wheels or pulleys 95 which constitute the driving members. For the purpose of insuring that the conveyor belts will have traction, we provide tension devices which press against the belts adjacent to the driving wheels or pulleys. In the arrangement shown, there is hung on the front end of each conveyor housing a swinging frame 127, carrying two rollers 128, each in the plane of and slightly lower than one of the driving pulleys 95. Each swinging frame is acted on by a spring 129 to draw it in a direction to press the rollers toward the conveyor belt. The front walls of the housings are slotted, as indicated at 130 in Fig. 7, to permit the rollers 128 to extend inwardly through such walls and into contact with the conveyors.

When the driven rollers on the inner ends of the picker units are of hard material, they may be roughened so as to secure better traction. In order to reduce the amount of wear on the segments that drive the picker elements, only a portion of each of the driven rollers may be roughened; the roughened zones being differently disposed on different rollers, so that one roller will have traction over a comparatively narrow path on the cooperating segments, while another roller in the same row will have traction along a different path. Such an expedient is illustrated in Fig. 21 in which one of the rollers 38 has a roughened section 38ª at the outer end, while the next adjacent roller has a roughened section 38ᵇ adjacent to its inner end.

In Figs. 24 to 28 there is illustrated a modified means for rotating the picker elements. Instead of employing the swinging wheels 52, wheels 135, are mounted directly on the wall of the drum between the picker elements of each row and the elements of the rows above and below the same. When the rollers on the picker elements ride under the segments 44 and in contact therewith they press the wheels 135 up into engagement with the rollers of the next higher row. Similarly, when the segments 45 are engaged from above by the driven rollers of the picker elements, they press the wheels 135 down into engagement with the rollers on the next lower roll. In order to make effective the segments that engage with the tops of the uppermost rollers and the bottoms of the lowermost rollers, we provide means to press the segments and the rollers together. In the arrangement shown, there is a pressure device for each roller in the upper and lowermost rows, each device consisting of a swinging arm 136 having at the free end a roller 137 that normally presses against the adjacent picker element roller. The arms 136 are acted on by springs 138 that tend constantly to hold the pressure rollers and the picker element rollers together. The segments pass between the pressure rollers and the picker rollers and are pressed by the former against the latter so as to produce a tractive effort.

The wheels 135 are preferably made of rubber or some other cushioning material molded or otherwise formed about a tubular metal center 140. In the tubular member there is preferably a bearing sleeve 141 of wood or other suitable material that does not require oil to lubricate the same. The wheel revolves on the sleeve 141 which, in turn, is rotatably supported by a pin 142 that is oval in cross-section; the pin being driven into or otherwise supported by a boss 143 on the inner side of the wall of the drum. The bearing sleeve is therefore permitted to move bodily a considerable distance in the vertical direction but is held against any material horizontal displacement.

While we have illustrated and described with particularity only a single preferred form of our invention, with only a few slight modifications, we do not desire to be limited to the exact structural details thus illustrated and described; but intend to cover all forms and arrangements which come within the definitions of our invention constituting the appended claims.

We claim:—

1. In a machine of the character described, a rotatable drum, picker elements extending through and rotatable in the wall of the drum, stationary segments of flexible material arranged within the drum, and means cooperating with said segments and said picker elements for causing movements of said picker elements along the segments to be translated into rotary movements of the picker elements about their own axes.

2. In a machine of the character described, a rotatable drum, a picker element extending through and rotatable in the wall of the drum, a stationary segment of flexible material in the drum beside the inner end of the picker element, and means to press the picker element and the segment together and cause the picker element to revolve on its own axis while carried by the drum along the segment.

3. In a machine of the character described, a rotatable drum, rotatable picker elements extending through the wall of the drum, elastic idler wheels mounted on the drum adjacent to the inner endes of said units, and stationary flexible segments in the drum in position to enter between the inner ends of the picker elements and the wheels and cause the picker elements to be rotated first in one direction and then in the other as the drum revolves.

4. In a machine of the character described, a rotatable drum, a rotatable picker element mounted in and extending through the wall of the drum and having a round driven member at its inner end, a round rotatable idler member mounted adjacent to said driven member, and a stationary flexible segment mounted in the drum in position to enter between said driven and idler members during a portion of each revolution of the drum, one of said members being yielding to permit the entrance of the segment between the said driven and idler members and provide traction for the driven member.

5. In a machine of the character described, a rotatable drum, two rotatable picker elements extending through the wall of the drum and spaced apart lengthwise of the drum, an idler wheel between the inner ends of the picker elements, two stationary flexible segments arranged within the drum, one of the segments being in position to enter between the inner end of one of said elements and the wheel in a certain angular position of the drum and the other segment being in position to enter between the inner end of the other picker element and the wheel in another angular position of the drum; the parts being so proportioned that whenever either segment is in operative relation to the picker elements during rotation of the drum one of such elemnts will be rotated through direct contact with the segment and the other element will be driven from the segment through the interposed wheel.

6. In a machine of the character described, a rotatable drum, circumferential rows of picker elements extending through and rotatable in the wall of the drum, stationary flexible segments arranged in the drum in two groups spaced apart from each other angularly of the drum, the segments of one group lying near planes tangent to the tops of rows of elements and the segments of the other group lying near planes tangent to the bottoms of the elements, and yieldable rotatable idlers mounted on the inside of the wall of the drum adjacent to the picker elements and each adapted to underlie and engage with one of the segments of one group and to overlie and engage with one of the segments of the other group, during each revolution of the drum, the parts being so proportioned that whenever an idler wheel engages with a segment it presses the latter against a picker element in one row and is in turn pressed against a picker element in an adjacent row.

7. In a machine of the character described, a rotatable drum, rotatable picker elements projecting from the drum, means to operate each of said elements to cause it to pick cotton while in certain positions in their motion with respect to the axis of the drum and to discharge the cotton while in other positions, and means arranged beside the drum to engage and polish the working ends of said elements when the latter are in still other positions.

8. In a machine of the character described, two upright drums spaced a short distance apart, picking devices projecting from the surfaces of the drums, and means for simultaneously rotating said drums in opposite directions and at different speeds.

9. In a machine of the character described, a rotary drum having thereon rows of projections, picker elements mounted in and protruding a short distance from the projections, means for rotating the drum, stationary clearing fingers extending into proximity to the drum, the side of each projection that is in front as the projection approaches the clearing fingers sloping gradually backward from the base toward the outer end.

10. In a machine of the character described, stationary spaced shoes gradually approaching each other and gradually increasing in height from front to rear to gather together the branches of cotton plants when the machine is moved along a row, means behind the shoes to receive the plants and pick the cotton therefrom, long free auxiliary shoes hinged at their rear ends to the front ends of the main shoes for swinging movements about a transverse axis and free at their front ends, and supporting means at the front ends of the auxiliary shoes adapted to rest upon and remain on top of the ground during the movements of the machine across a field.

11. In a machine of the character described, long stationary pointed shoes diverging from each other from the rear ends toward the front, the shoes increasing gradually in height from the front to the rear ends, a long free auxiliary shoe hinged to each shoe near the front end so as to be capable of swinging about a transverse horizontal axis and free at its front end, the auxiliary shoes diverging from each other to form a flaring mouth to the space between the shoes, ground wheels on the front ends of the auxiliary shoes, and means in rear of the stationary shoes to receive cotton plants lifted by the shoes and pick cotton from such plants.

12. In a machine of the character described, two vertical rotatable drums, a housing positioned adjacent to each drum on the side farthest from the other drum, each housing having an opening to receive the near side of the corresponding drum, picker devices on the drums, means to operate said devices in a manner to cause them to pick cotton from plants passing between the drums and to discharge the cotton into said housings, an endless conveyor in each housing having a single horizontal run at the bottom of the housing and long runs extending up at the front and rear of the housing, and a receptacle on the outer side of each housing in position to receive cotton raised to the top of the housing by the conveyor.

13. In a machine of the character described, a rotatable drum, a circumferential row of picker elements extending through and rotatable in the wall of the drum, each element having on the inner end an elongated roller of hard material, a stationary segment of flexible material in position to be engaged by the said rollers as they travel along the same, and means to press the segment and the rollers together while in contact with each other, each roller having a roughened surface in the form of a narrow band extending around the same, the bands on some of the rollers being placed nearer the inner ends than are the bands on other of the rollers.

14. In combination, a drum having openings in its wall, picker units frictionally held in said openings and having driven elements exposed in the interior of the drum.

15. In combination, a drum having openings in its wall, and picker units frictionally held in said openings and adapted to be moved into and out of the openings from the outer side of the drum, each said unit having a tool-engaging part adapted to receive a tool for drawing the unit outward.

16. In a machine of the character described, a revoluble drum, picker elements projecting from the drum and rotatable about their own axes, and a rapidly-revolving polishing means in position to engage with and polish the picking end of each element as it is carried past the polishing means.

17. In combination, a support having an opening therethrough, and a picker unit frictionally held in said opening and adapted to be moved bodily in the inward direction under an external pressure smaller than that required to injure the picker element.

18. In combination, a support having an opening therethrough, a picker unit comprising a picker element and a bearing sleeve of wood, surrounding said element and held against removal therefrom, all of the parts of the picker unit lying within the space surrounded by the outer surface of the sleeve extended, said sleeve being frictionally fitted into said opening.

19. In combination, a support having an outwardly projecting boss thereon, and a picker unit extending through and frictionally held in said boss, the outer end of the picking element being in the form of a head having hook-shaped prongs, the parts being so positioned with respect to each other that the inner ends of the prongs are housed within the boss.

20. In combination, a support having an outwardly projecting boss thereon, and a picker unit extending through and frictionally held in said boss, the outer end of the picker being in the form of a head having hook-shaped prongs, the parts being so positioned with respect to each other that the inner ends of the prongs are housed within the boss, said boss having on the underside and at some distance from the outer end a port or passage to permit the escape of foreign matter entering the opening in the boss past the head.

21. In a machine of the character described, a housing open on the side, an upright rotatable drum beside the housing and projecting into the open side, an endless conveyor in the housing so disposed as to form upper and lower horizontal runs and two upright runs, means on the drum to pick cotton and discharge it on the lower run of the conveyor, means cooperating with one of the upright runs of the conveyor to enable the latter to raise the cotton to the top of the housing, and means extending into the housing below the upper run of the conveyor to receive the cotton therefrom.

22. In combination, a support having an opening therein, a picker unit rotatably mounted on said support and having a head projecting through said opening, said head having hook-shaped prongs the inner ends of which lie within said opening and the points of which lie outwardly beyond said opening.

23. In a machine of the character described, two parallel upright drums separated from each other only a short distance, each drum having on its periphery circumferential rows of bosses, rotatable picker elements projecting slightly from said bosses, the rows of bosses on one drum being displaced in the vertical direction with respect to the rows on the other drum, and means for rotating said drums in opposite directions.

24. In a machine of the character described, two parallel upright drums separated only a short distance from each other, each drum having on its periphery circumferential rows of bosses, rotatable picker elements projecting slightly from the ends of said bosses, the rows of bosses on one drum being displaced in the vertical direction with respect to the rows on the other drum, and means for rotating said drums in opposite directions, the sides of the bosses that are in advance sloping gradually in the inward direction and forwardly from the outer ends of the bosses.

25. In a machine of the character described, an upright rotatable drum, an endless conveyor beside the drum having long upright runs and longitudinal runs above and below the drum, means on the drum between the planes of the longitudinal runs to pick cotton and discharge it upon the lower longitudinal run, means cooperating with one of the upright runs to cause the cotton to be carried upward by the latter on the inner side thereof to the inner side of the upper longitudinal run, and means to receive the cotton dropping down from said upper run.

26. In a machine of the character described, an upright rotatable drum, an endless conveyor beside the drum having long upright runs and longitudinal runs above and below the drum, means on the drum between the planes of the longitudinal runs to pick cotton and discharge it upon the lower longitudinal run, wall devices extending upward near the inner side of one of the upright runs and then inwardly a short distance below and near the upper run to cause the cotton to be raised and then be dropped toward the lower run from the upper run, and means to receive the cotton dropping from the upper run.

27. In combination, a hollow drum having openings in its wall, and self-contained picker units disposed in said openings, each picker unit having at one end a head projecting beyond the exterior of the drum and at the other end a round driven element, said driven element and the body portion of the unit being sufficiently small to permit said units to be inserted in said openings from the exterior of the drum.

28. In combination, a hollow drum having openings in its wall, and self-contained picker units disposed in said openings, each picker unit having at one end a head projecting beyond the exterior of the drum and at the other end a round driven element, said driven element and the body portion of the unit being sufficiently small to permit said units to be inserted in said openings from the exterior of the drum, and means at the periphery of each unit cooperating with the surrounding part of the drum to hold the unit in place.

29. In combination, a hollow drum having openings in its wall, and self-contained picker units disposed in said openings, each picker unit having at one end a head projecting beyond the exterior of the drum and at the other end a round driven element, said driven element and the body portion of the unit being sufficiently small to permit said units to be inserted in said openings from the exterior of the drum, and means at the periphery of each unit cooperating with the surrounding part of the drum yieldingly to hold the unit against withdrawal from the opening in which it lies while allowing it to be withdrawn when a predetermined force is applied.

In testimony whereof, we sign this specification.

GEO. R. MEYERCORD.
OLIN H. BASQUIN.